US010163160B1

(12) United States Patent
Gaeta et al.

(10) Patent No.: US 10,163,160 B1
(45) Date of Patent: Dec. 25, 2018

(54) METHOD AND SYSTEM FOR PERFORMING HOMEOWNER'S INSURANCE INSURABILITY ANALYSIS

(75) Inventors: Michael Joseph Gaeta, San Antonio, TX (US); Michael Richard Wilkins, Fair Oaks Ranch, TX (US); Cedric Matterson, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1023 days.

(21) Appl. No.: 13/095,700

(22) Filed: Apr. 27, 2011

(51) Int. Cl.
*G06Q 40/08* (2012.01)

(52) U.S. Cl.
CPC .................... *G06Q 40/08* (2013.01)

(58) Field of Classification Search
CPC ...................................... G06Q 40/08
USPC ............................................. 705/35
See application file for complete search history.

(56) References Cited

U.S. PATENT DOCUMENTS

| | | | |
|---|---|---|---|
| 7,610,210 B2* | 10/2009 | Helitzer et al. .................... | 705/4 |
| 7,792,527 B2* | 9/2010 | Wu ....................... | H04L 63/062 |
| | | | 370/466 |
| 8,712,805 B1* | 4/2014 | Ferries ................... | G06Q 50/16 |
| | | | 382/106 |
| 9,916,625 B2* | 3/2018 | Lehman .................. | G06Q 40/08 |
| 2002/0049624 A1* | 4/2002 | Raveis, Jr. .......................... | 705/8 |
| 2007/0233527 A1* | 10/2007 | Dillard ................. | G06Q 40/025 |
| | | | 705/4 |
| 2009/0204444 A1* | 8/2009 | Tucker et al. ..................... | 705/4 |
| 2010/0153301 A1* | 6/2010 | Callow et al. ............. | 705/36 R |
| 2011/0153368 A1* | 6/2011 | Pierre et al. ...................... | 705/4 |
| 2012/0072239 A1* | 3/2012 | Gibbard et al. .................. | 705/4 |

OTHER PUBLICATIONS

"Car Insurance Companies offering Discounts for Tracking Privileges" Apr. 20, 2010 (Year: 2010).*

* cited by examiner

*Primary Examiner* — Bruce I Ebersman
(74) *Attorney, Agent, or Firm* — Baker & Hostetler LLP

(57) ABSTRACT

A method for identifying whether a house qualifies for homeowner's insurance is provided. The method includes receiving, by a computer system, from a user device, an indication of the house. The computer system is operated on behalf of an entity that issues homeowner's insurance, The user device is operated by a prospective purchaser of the house, and the indication is sufficient to identify the house. The method also includes retrieving, from a first database, characteristics linked with the house. The characteristics include one or more geohazard characteristics. The method further includes determining, whether the house qualifies for homeowner's insurance by the entity that issues homeowner's insurance using the characteristics linked with the house, storing, data indicating whether the house qualifies for homeowner's insurance, and transmitting to the user device of the prospective purchaser, the indication of whether the house qualifies for homeowner's insurance.

15 Claims, 8 Drawing Sheets

METHOD AND SYSTEM FOR PERFORMING HOMEOWNER'S INSURANCE INSURABILITY ANALYSIS

BACKGROUND OF THE INVENTION

Customers demand more of the products and services they use than ever before. They insist that the companies they deal with on a regular basis provide them greater and greater levels of accuracy and more tailored service offerings. Companies configure and operate ever increasing numbers of computer systems to achieve this. Using sources of information that have traditionally been unavailable when servicing these customers is now expected.

SUMMARY OF THE INVENTION

The present invention relates generally to insurance systems. More specifically, the present invention provides methods and systems related to homeowner's insurance. Merely by way of example, the invention has been applied to a method and system for identifying whether a house is eligible for homeowner's insurance. The methods and techniques can be applied to a variety of other forms of insurance and property, such as automotive insurance for a vehicle, flood insurance for a house or building, boat insurance for a boat, or the like.

According to an embodiment of the present invention, a method for identifying whether a house qualifies for homeowner's insurance is provided. The method includes receiving, by a computer system, from a user device, an indication of the house. The computer system is operated on behalf of an entity that issues homeowner's insurance, the user device is operated by a prospective purchaser of the house, and the indication is sufficient to identify the house. The method also includes retrieving, by the computer system, from a first database, characteristics linked with the house. The characteristics include one or more geohazard characteristics. The method further includes determining, by the computer system, whether the house qualifies for homeowner's insurance by the entity that issues homeowner's insurance using the characteristics linked with the house, storing, by the computer system, data indicating whether the house qualifies for homeowner's insurance, and transmitting, by the computer system, to the user device of the prospective purchaser, the indication of whether the house qualifies for homeowner's insurance.

According to another embodiment of the present invention, a non-transitory computer-readable storage medium comprising a plurality of computer-readable instructions tangibly embodied on the computer-readable storage medium is provided, which, when executed by a data processor, identifies whether a house is eligible for homeowner's insurance. The plurality of instructions include instructions that allow an indication of the house to be received, from a user device. The data processor is operated on behalf of an entity that issues homeowner's insurance, the user device is operated by a prospective purchaser of the house, and the indication is sufficient to identify the house. The plurality of instructions also include instructions that cause characteristics linked with the house to be retrieved from a first database. The characteristics include one or more geohazard characteristics. The plurality of instructions further include instructions that cause the data processor to determine whether the house qualifies for homeowner's insurance by the entity that issues homeowner's insurance using the characteristics linked with the house, instructions that cause data indicating whether the house is eligible for homeowner's insurance to be stored, and instructions that cause indication of whether the house qualifies for homeowner's insurance to be transmitted to the user device of the prospective purchaser.

According to an alternative embodiment of the present invention, a system for identifying whether a house qualifies for homeowner's insurance is provided. The system includes an input module for receiving, from a user device, an indication of the house. The input module is operated on behalf of an entity that issues homeowner's insurance, the user device is operated by a prospective purchaser of the house, and the indication is sufficient to identify the house. The system also includes a first database module for retrieving from a first database, characteristics linked with the house. The characteristics include one or more geohazard characteristics. The system further includes a first processing module for determining whether the house qualifies for homeowner's insurance by the entity that issues homeowner's insurance using the characteristics linked with the house, a storage module for storing data indicating whether the house is eligible for homeowner's insurance, and a first output module for transmitting to the user device of the prospective purchaser, the indication of whether the house qualifies for homeowner's insurance.

Numerous benefits are achieved by way of the present invention over conventional techniques. For example, embodiments of the present invention may help a prospective homebuyer determine whether homeowner's insurance is available for a home the prospective homebuyer is considering buying. Further, the prospective homebuyer may receive a quote including for the cost of homeowner's insurance premiums and deductibles from a particular homeowner's insurance company. These and other embodiments of the invention, along with many of its advantages and features, are described in more detail in conjunction with the text below and attached figures.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION OF SPECIFIC EMBODIMENTS

Figure 1:
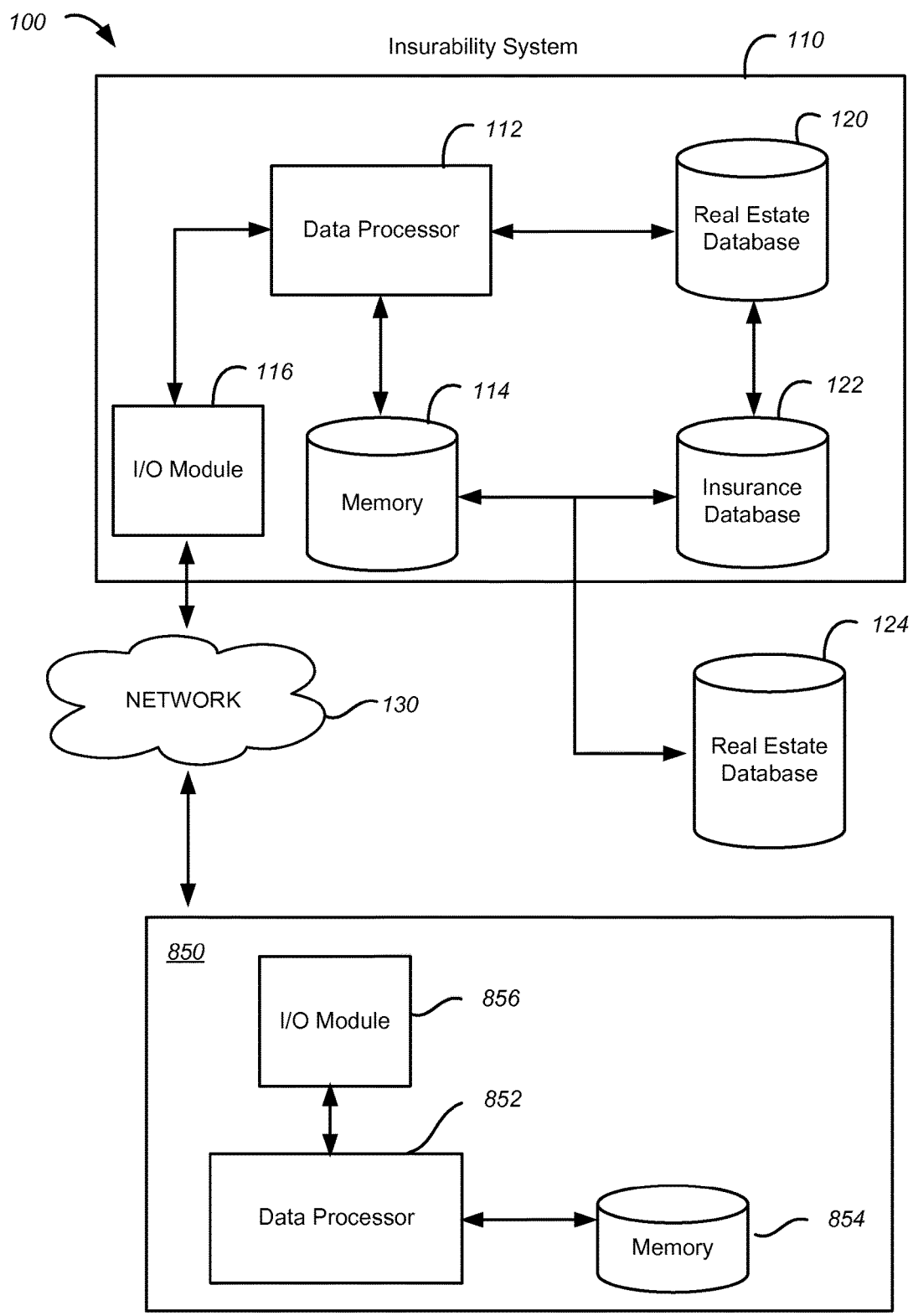
FIG. 1 is a high level schematic diagram illustrating an insurability system according to an embodiment of the present invention.

Embodiments of the present invention relate to technologies to facilitate homeowners and/or renters in finding, acquiring, insuring, and/or maintaining real property. Technologies related to embodiments of the present invention support a homeowner/renter, for example, a member of the present assignee, with the initial preparation associated with the purchase of a home and/or rental of a home/apartment. Such initial preparation can include advice and counseling related to a person's ability to afford a home or apartment, development of a financial plan to facilitate the acquisition, web-enabled self-service systems (e.g., home purchase calculators) used to determine financial goals and requirements, and/or on-line member communities related to homeownership and/or rental.

After a person completes initial preparation, technologies related to embodiments of the present invention assist the person in finding suitable properties through the use of rent/buy listings including information tailored to each person's interests and background. For example, preapproval of the person for mortgage rates and/or homeowner's/renter's insurance can be used to provide rich information content as part of the search process. On-line member communities can be used to assist users in finding property that is suitable for the particular user's interests and income.

Additionally, technologies related to embodiments of the present invention provide for assistance in the purchase/rental transaction, including obtaining a mortgage and provision of assistance in negotiating the purchase or lease. Protection of the newly acquired home or rented property is also related to embodiments of the present invention, in one of several forms including homeowner's insurance, mortgage life insurance, renter's insurance, flood insurance, personal property insurance, home security systems, home warranties, and the like.

Moreover, technologies related to embodiments of the present invention provide a person with assistance in moving to, maintaining and/or renovating, and/or refinancing the newly purchased or rented property. Thus, embodiments of the present invention relate to technologies that provide a one-stop home resource for delivering home solutions related to buying, selling, renting, and/or owning real property. In particular embodiments, members of a membership organization (e.g., the present assignee) utilize the methods and systems described herein to manage their real property interests and interact with other community members to enable new concepts related to homes and other real property.

Technologies related to embodiments of the present invention support a prospective homebuyer, for example, a member of the present assignee, with research associated with the purchase of a home. Such research can include advice and counseling related to a person's ability to afford a home, web-enabled self-service systems (e.g., home purchase calculators) used to determine financial goals and requirements, and/or identifying whether a home is eligible for homeowner's insurance, such as homeowner's insurance issued by the present assignee, and how much such homeowner's insurance is going to cost.

Contacting an insurance company regarding whether homeowner's insurance is available and/or the cost of the homeowner's insurance for a house being considered for purchase may be low on the list of priorities of a prospective homebuyer as compared with the plethora of other considerations and obligations during the home buying process. After proceeding through a substantial portion of the home buying process, a prospective home buyer (also referred to herein as a user and a buyer), may be startled to realized that the house the prospective homebuyer is considering purchasing (or has already bought) is not eligible for homeowner's insurance through one or more entities that issue insurance or that such homeowner's insurance is available only at a higher than expected cost. As such, a prospective homebuyer may benefit from access to total cost of ownership information early in the home buying process. This information may include data regarding whether or not one or more particular insurance companies will issue homeowner's insurance for the home. If so, a quote of the cost of homeowner's insurance (including premiums and/or deductibles) may be provided to the prospective homebuyer. Further, if the entity that issues the total cost of ownership information has data regarding the prospective homebuyer on record, the total cost of ownership information may be tailored specifically to the user. For example, personal financial information, such as credit information of the prospective homebuyer, may be used to provide the prospective homebuyer with more accurate total cost of ownership data.

Figure 8:
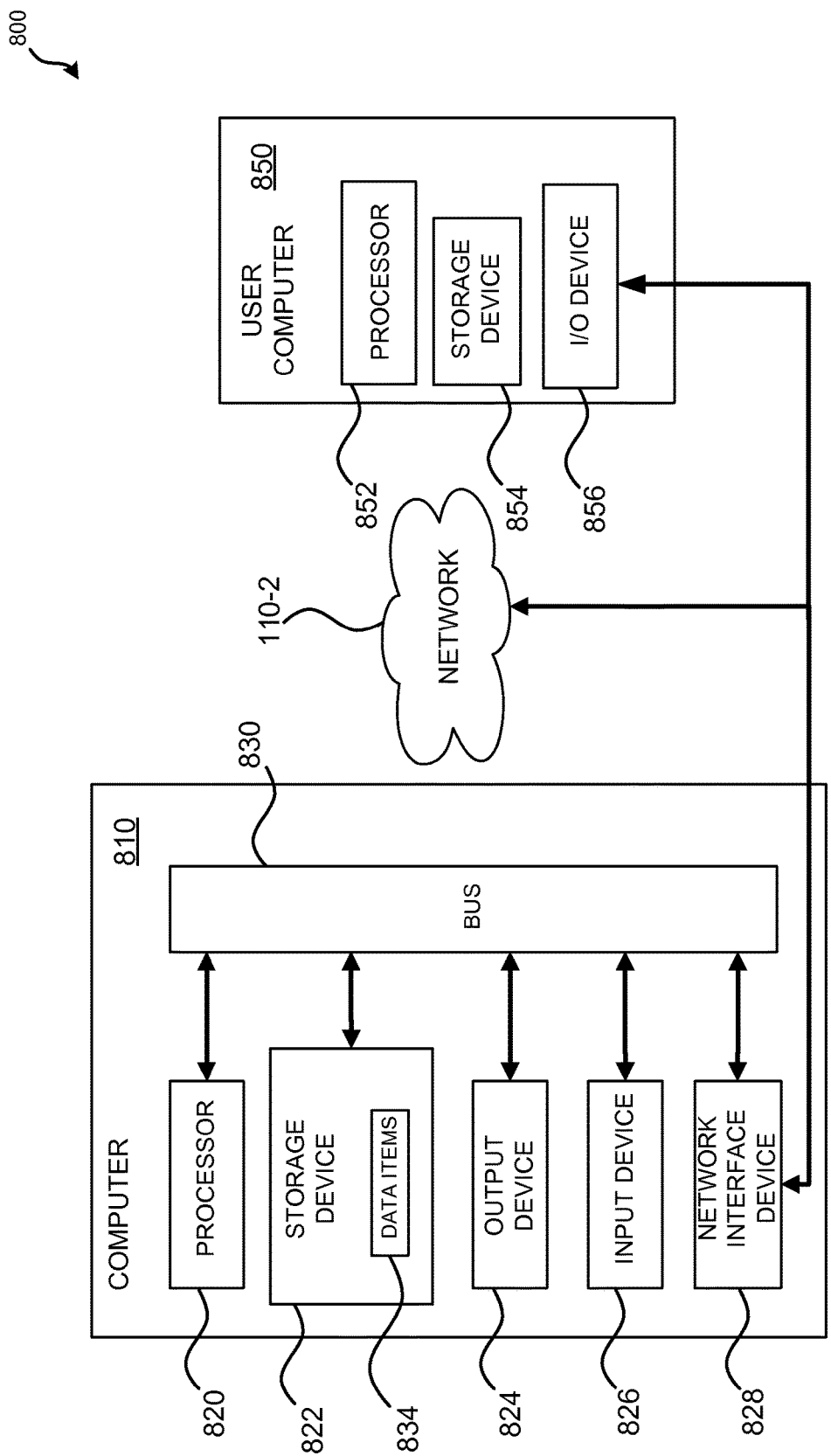
FIG. 8 is high level schematic diagram illustrating a computer system including instructions to perform any one or more of the methodologies described herein.

FIG. 1 is a high level schematic diagram illustrating an insurability system according to an embodiment of the present invention. As illustrated in FIG. 1, a user operating user computer 150 interacts with the insurability system 110 through network 130. User computer 150 can include one of many types of computing devices including, without limitation, a personal computer, a laptop computer, a notebook computer, a tablet computer, a handheld mobile device, a PDA, a mobile phone, or the like. The insurability system 110 includes a data processor 112, also referred to as a processor, and a memory 114. The description provided in relation to processors and memory in FIG. 8 is also applicable to the data processor 112 and memory 114. An input/output module 116 is provided to enable communication with the insurability system by external users and computers.

The insurability system 110 also includes an internal real estate database 120, external real estate database 124, and an insurance database 122. The insurability system 110 is communicatively coupled, in one example, to an external real estate database containing information on various houses. The internal real estate database 120, in contrast with the external real estate database 124, is maintained by the company operating the insurability system 110, typically an insurance company. As described more fully throughout the present specification, the I/O module 116, the data processor 112, memory 114, internal real estate database 120, and insurance database 122 are utilized to receive inputs from a user operating user computer 150 and determine the insurability of a property in view of characteristics of the property, such as geohazards. In addition to basing insurance rates, in part, on the geohazards associated with the property, information on the geohazards can be provided to the user in order to enable the user to make an informed decision during a property search process.

Although an external real estate database 124 is illustrated in FIG. 1, this is not required by embodiments of the present invention. In some embodiments, real estate data is maintained internally within the insurability system. Preferably, data from both internal and external sources is integrated to provide the system operator with data that is both useful and low in cost.

A user operating user computer 150 interacts with the insurability system 100 through network 130, which may be the Internet. In some embodiments, the network 130 is partly or wholly a private wide area network, local area network, or the like. In an embodiment described in additional detail below, a user can enter an address or a search query using user interface 158, which results in data transfer through I/O module 156 and network 130. The information from the user, for example, an address, can be used by the insurability system 110 to determine the insurability of a house linked with the address, the insurability of the property associated with the address, and/or an insurance rate associated with the address. The user computer 150 can receive responses and information from the insurability system 110, process the received information using data processor 152, store the received and/or processed information using memory 154, and display the processed/stored information using the user interface 158. As an example, a customer of an insurance company (e.g., a member of the present assignee) can use the user computer 150 to interact with an insurance company (e.g., the present assignee) through the Internet, providing and receiving information through web pages operated by the insurance company (e.g., the present assignee's website).

Figure 2:
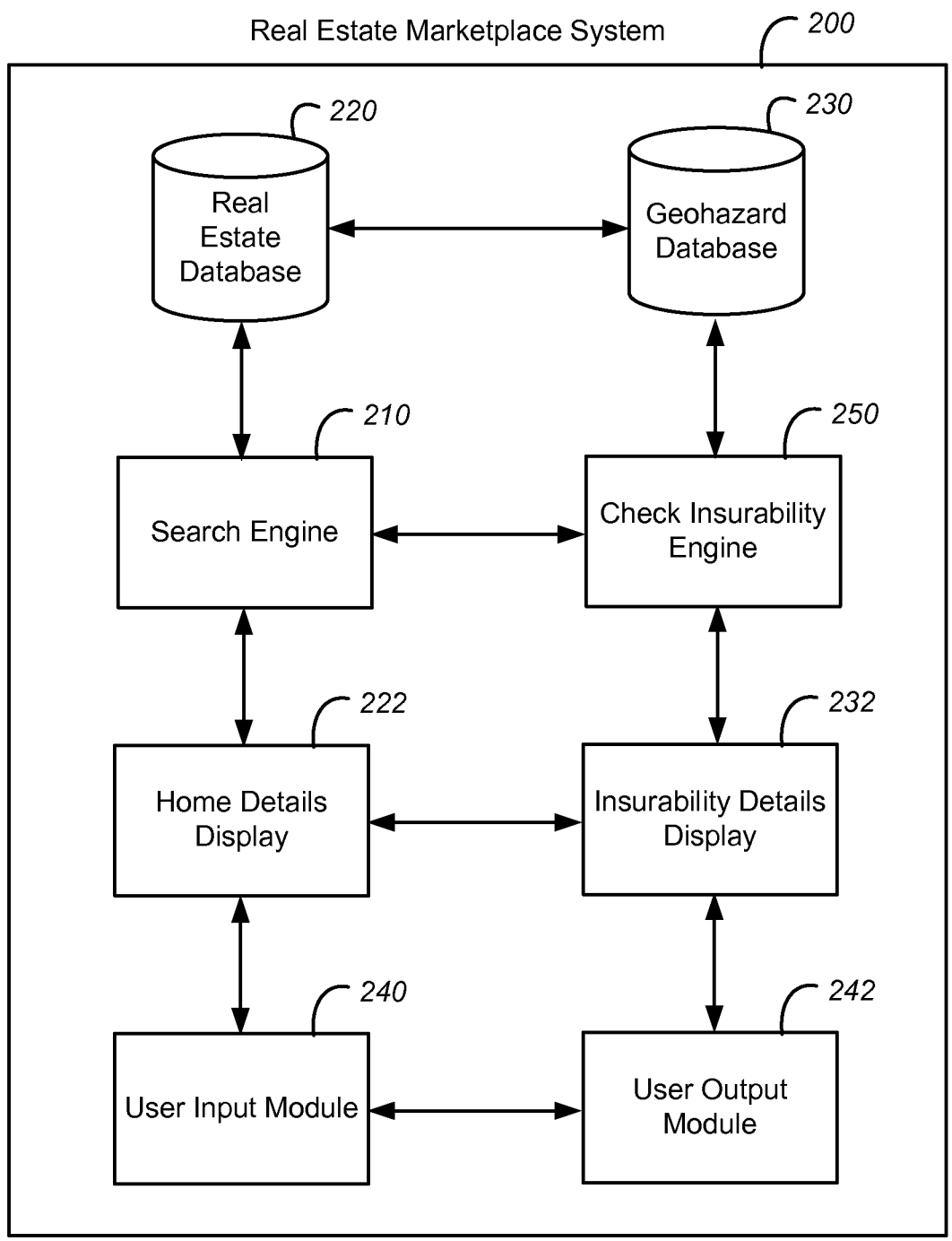
FIG. 2 is a high level schematic diagram illustrating a system for searching real estate listings and displaying insurability information related to homes returned by the search according to an embodiment of the present invention.

FIG. 2 is a high level schematic diagram illustrating a system for searching real estate listings and displaying insurability information related to homes returned by the search according to an embodiment of the present invention. As illustrated in FIG. 2, a real estate marketplace system 200 includes a user input module 240 and a user output module 242. In an embodiment, the user input and output is provided through one or more web pages accessed through the Internet.

The user is able to enter information used by the real estate marketplace system, for example, by the search engine 210. As described more fully in relation to FIG. 3 below, the search engine 210 receives search parameters from the user and accesses the real estate database 220 to determine properties matching the search parameters. Information on the properties (e.g., homes) matching the search parameters is presented to the user using the home details display 222. The home details display 222 can be a portion of a web page adapted to display information related to the home such as number of bedrooms, square footage, and the like.

Information used by the check insurability engine 250 may be provided by the user using the user input module 240 or may be provided as a result of the search performed by the search engine 210. As described in relation to FIG. 3, an identifier (e.g., an address) for one or more of the homes returned in the search will be provided to the check insurability engine 250 in order to determine the geohazards associated with the one or more homes. Information used by the check insurability engine 250 is included in the geohazards database 230. The geohazards associated with a home, possibly along with other characteristics of a house, are displayed using the insurability details display 232, which, like the home details display 222, can be a portion of the web page. In an embodiment, an area adjacent the home details display is used to display the insurability details. Information related to the insurability of a house may also be output using the user output module, for example, in the form of a report, an email notification, information posted to a server, or the like.

In the embodiment illustrated in FIG. 2, the real estate marketplace system may provide a link or a separate display area for a check insurability function. In this example embodiment, once a home is returned by the search engine 210, a user has the option to check the insurability of the home, including a determination of the insurability based on geohazards associated with the home as well as additional premiums associated with the geohazards in the case that the home is insurable. Thus, embodiments of the present invention provide functionality not available using conventional home search systems, since in addition to the basic real estate information related to the home, the user is able to determine if the home is uninsurable on account of geohazards associated with the home. If the home is uninsurable, the user is able to obtain this information early in the search process, rather than late in the process when the user tries to obtain insurance. In addition to information that the home is uninsurable, the user could be provided with information on the geohazards and an additional insurance expense resulting from the geohazards.

Figure 3:
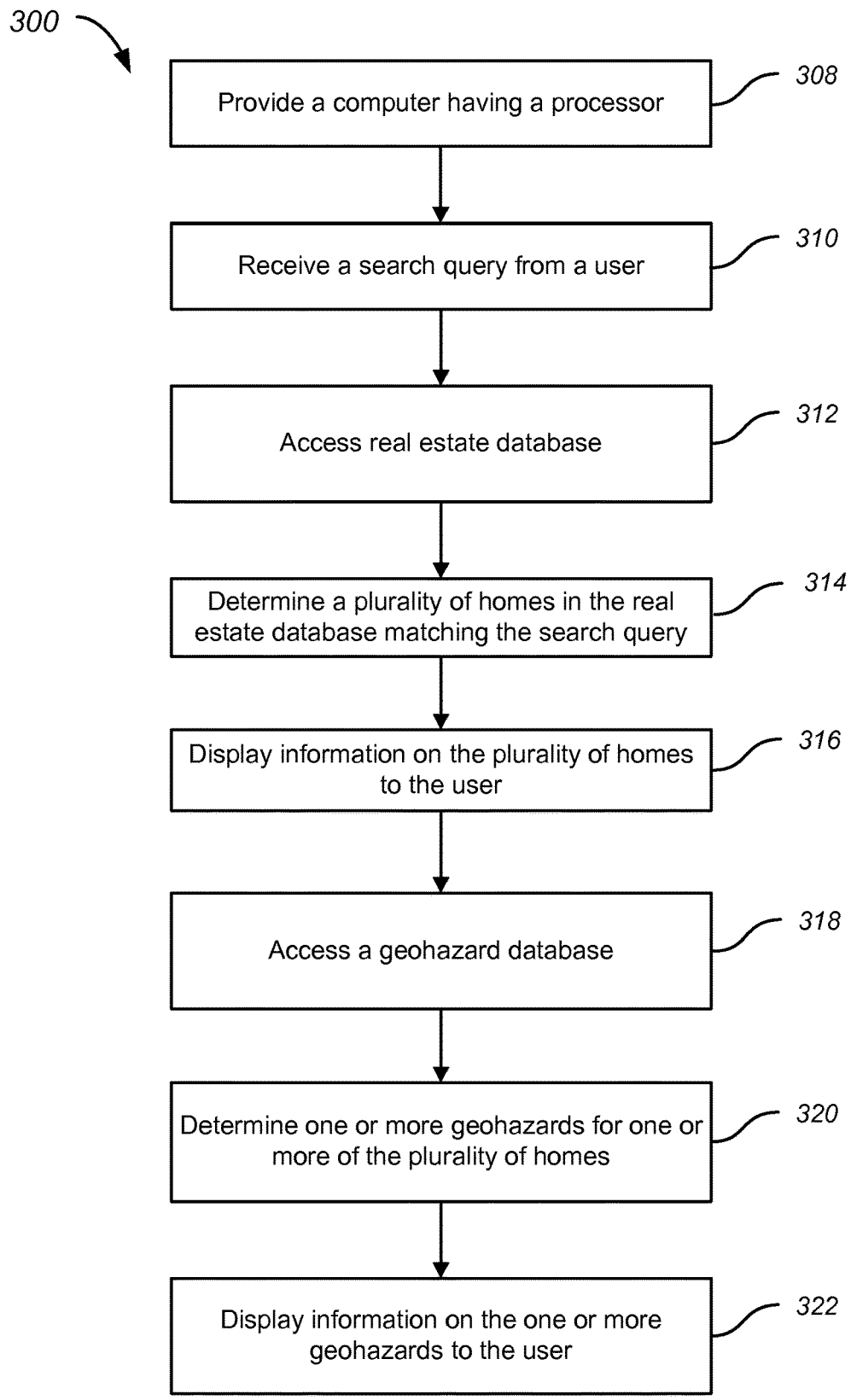
FIG. 3 is a high level flowchart illustrating a method of searching real estate listings and displaying geohazard information related to homes returned by the search according to an embodiment of the present invention.

FIG. 3 is a high level flowchart illustrating a method of searching real estate listings and displaying geohazard information related to homes returned by the search according to an embodiment of the present invention. The method 300 includes providing a computer having a processor (308) and receiving a search query from a user (310). In an embodiment of the present invention, the search query is input by the user using user input module 240 and the search query is received by the search engine 210 illustrated in FIG. 2. An individual interested in purchasing real estate can enter a number of different search parameters or criteria for searching by the search engine 210, such as price range, square footage, number of bedrooms, and the like. The search engine accesses the real estate database 220, which includes listings and details about property for sale in a particular location (312). For example, the real estate database 220 may be provided by a listing service such as those that provide basic real estate information specific to realty that is for sale in an area. Information in the real estate database 220 can include data about the property, such as the number of bedrooms, price range, or if there is a pool, for example. The real estate database 220 may also include information specific to a property, such as sales history, zoning parameters, or an estimated property value, for example. Additional description related to real estate databases is provided in commonly assigned and copending U.S. patent application Ser. No. 12/206,814, entitled "Systems and Methods for Providing a Real Estate and Rental Marketplace," filed on Sep. 9, 2008, the disclosure of which is hereby incorporated by reference in its entirety.

According to embodiments of the present invention, real estate data from one or more real estate databases (e.g., data from the Multiple Listing Service (MLS)) is stored for analysis and display to the user. By storing MLS or other real estate data over time, an analysis can be performed to determine changes in home price and features, providing insight into additions, remodeling due to damage, or the like. In addition to MLS data, data from other aggregated real estate listing networks is included within the scope of the present invention and the MLS is merely discussed as an example of the data that can be utilized by embodiments of the present invention.

In addition to cached real estate data, embodiments of the present invention can utilize real estate data available from a membership organization (e.g., the present assignee). For some homes, multiple members of the organization will have lived in the home. As members move in an out of homes in an area, data on the homes is available to the membership organization and is cached for use in embodiments of the present invention.

The search engine 210, in conjunction with the real estate database 220, determines and returns a search result including a plurality of properties matching the search query (314). Information on the plurality of homes is displayed to the user (316). In some embodiments, the user output module 242 is utilized to display the results to the user. Typically, the information is displayed using a web page and includes one or more photos of the home adjacent to the information related to the home. One of ordinary skill in the art would recognize many variations, modifications, and alternatives.

The method also include accessing a geohazard database (318) to determine one or more geohazards associated with one or more of the plurality of homes (320). In a specific embodiment, geohazard information is determined for all of the homes indicated by the user, whereas in other embodiments, for example the one illustrated in FIG. 3, geohazard information is only determined for particular homes returned by the search. The geohazard database can be accessed and information on geohazards determined based on the address of the home, the parcel number, or the like. The information on the one or more geohazards is displayed to the user (322). Typically, the geohazard information is displayed using the same output module 242 that is used to display the search results. Thus, in addition to the usual information on the homes returned in by the search, geohazard information is also displayed for the user.

In the embodiment illustrated in FIG. 3, a user searches for homes available in an area and a list of available homes is returned by a search engine (i.e., a real estate marketplace application). For one or more of the homes returned in the list, the addresses can be used as inputs to search the geohazard database in order to provide information on geohazards to the user. Thus, embodiments of the present invention provide functionality not available using conventional real estate search services by providing geohazard information not conventionally available to home purchasers. In another embodiment, rather than first determining a plurality of homes matching a search query, a user can directly enter an address used by the check insurability engine 250, which can use the address to determine one or more geohazards associated with the address of interest.

At the present time, determining the geohazards associated with an address can involve the use of charge-per-use databases or other processes that are expensive. Thus in some embodiments, presentation of geohazards data for an address is available as a premium service. Referring to FIG. 3, for initial search results returned when searching for homes, geohazards data may not be displayed, but when a person saves a home for future reference, this may trigger the geohazards analysis engine. In this example, the next time a person viewed the home, a notification could be provided that the geohazards have been analyzed and an insurability check has been performed that is now available to the user. As the cost of performing the geohazards analysis decreases, the implementation of the geohazard analysis process could be expanded as appropriate.

Although an embodiment of the present invention determines geohazard information on each of the homes returned by the search results, this is not required by the present invention. Because determining the geohazards applicable to a given property may involve a non-zero cost, the determination of the applicable geohazards may only be performed for a subset of the homes returned by the search. Additionally, since some homes may not have any geohazards associated with the home, no geohazard information will be returned. For these cases, an indication that the home is free from geohazards may be provided to the user in place of the geohazard information.

In some embodiments, the analysis of geohazards is performed upon request, whereas in other embodiments, it is performed on a real-time basis, running behind the scenes. In this embodiment, when a listing including an address of a home is returned, the insurability risk will be computed and information on the geohazards associated with the home will be provided to the user. Such information can include the premium difference associated with the geohazard or the fact that the property is not insurable as a result of the geohazard.

The geohazard data can be provided by external or internal sources. Typically, data from both external and internal sources is aggregated using a rules-based engine to provide information useful in determining the insurance impact of geohazards associated with a given property. As an example of both expert and community information used in determining the insurance impact of geohazards, news sources and other cloud sources can be utilized to supplement databases of geohazard information. As an example, if a neighborhood or an area of town experiences subsidence that is reported in the local news, archived new stories could be utilized in combination with other data sources to provide a long term view of this geohazard. Information on neighborhoods contained in blogs, newspapers, magazines, web sites, and the like can be utilized and aggregated to provide inputs to the check insurability engine.

According to an embodiment of the present invention, a sentiment analysis can be performed on new stories, community content, social media, and the like to build a comprehensive score around a home builder, local schools, the neighborhood, local crime, and the like. Thus, a comprehensive database including the combination of user information, media content, and expert information is provided. This information can be presented in a personalized user interface to provide additional in-depth information about the address of interest.

A person performing the method illustrated in FIG. 3 using the system illustrated in FIG. 2 could be provided with search results that include three homes in a given neighborhood. In addition to the real estate information usually provided in relation to the homes, embodiments of the present invention will provide the user with visibility into the geohazards data for one or more of the homes as well. Thus, for these three example homes, if two of the homes have a higher insurance premium due to their location being in a brush fire zone, this information may influence the user to purchase the third home for which the insurance premiums are lower. Without the availability of the geohazards data provided by embodiments of the present invention, the user is not able to determine the differences in insurance premiums between these three homes until much later in the purchase process if at all. Thus, it will be understood that determining one or more geohazards for each of the plurality of homes may be performed for less than the total number of homes returned in the search, since the plurality of home may be a subset of the total number of homes returned by the search.

Embodiments of the present invention include a variety of different data presentation modes. In one embodiment, a binary presentation of insurable/not insurable is provided based on the geohazards analysis. Another version of a binary presentation is that geohazards are associated with an address or not associated with an address. In other embodiments for which the property is insurable, an insurance cost index, for example, on a scale of 0 to 100 can be provided to provide the user with information on the impact of the geohazards on the address. In yet other embodiments, the actual premium difference is displayed to the user. One of ordinary skill in the art would recognize many variations, modifications, and alternatives.

In another embodiment, a geohazards tab is provided in association with the home listings resulting from the search. When a user selects the geohazards tab, information on the geohazards associated with the home, if any, are presented to the user. As an example, if the home is in a flood plain and the customer will need flood insurance, the price for the flood insurance policy can be computed and displayed to the user. If water damage claims have been made on the property, this information could be presented to the user, providing an indication that flooding damage is likely in the future.

Data on geohazards presented to the user can include a history of past insurance claims for the address of interest. In addition to displaying an insurance claims history for the home, information from city planning departments and the like can be displayed to provide a user with information on remodeling of the home, permits applied for on the home, permits granted on the home, and the like.

In addition to information on geohazards and insurance claim history being made available for an address of interest, embodiments of the present invention provide information on homes within a predetermined distance of the address of interest. As an example, if a home on the same street as the home at the address of interest had filed a water damage claim, this information could be presented to the user, since this can provide an indication that flooding problems may exist in the neighborhood.

As an example, in a wildfire prone area, fire risk data for homes is available on a per-home basis. Although an address of interest may not have a high fire risk, other homes in the neighborhood may have a high fire risk. In this example, a user interested in the home at the address of interest is presented with information on the fire risk of other nearby homes since such information may indicate that evacuations due to fire threat may be common in the neighborhood. Thus, although a particular home is not susceptible to a particular geohazard, the fact that other homes in the neighborhood are susceptible to a particular geohazard may be useful information for the potential homebuyer.

Utilizing embodiments of the present invention, a financial services company (e.g., a bank, an insurance company, a mortgage lender, and the like) is able to expose a customer to the geohazards associated with a particular property at an early stage in the home acquisition process. Thus, customer satisfaction is improved since expectations are set early, not with the customer finding out near the closing that the home is uninsurable or only insurable at a higher than expected cost. Thus, geohazards are a part of the decision criteria during the home selection phase of the home buying process.

It should be appreciated that the specific steps illustrated in FIG. 3 provide a particular method of method of searching real estate listings and displaying geohazard information related to homes returned by the search according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
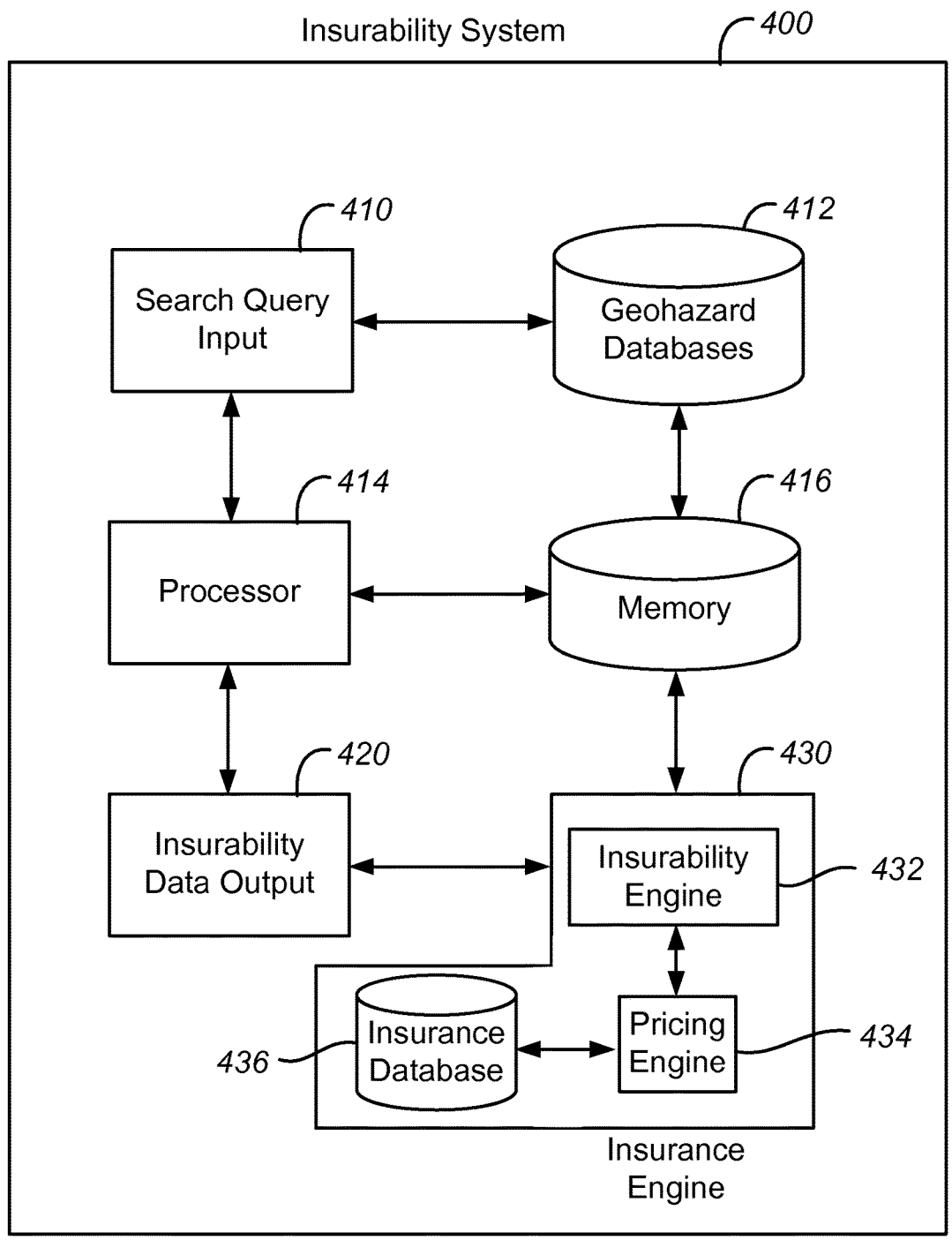
FIG. 4 is a high level schematic diagram illustrating a system for determining insurability according to an embodiment of the present invention.
Figure 6:
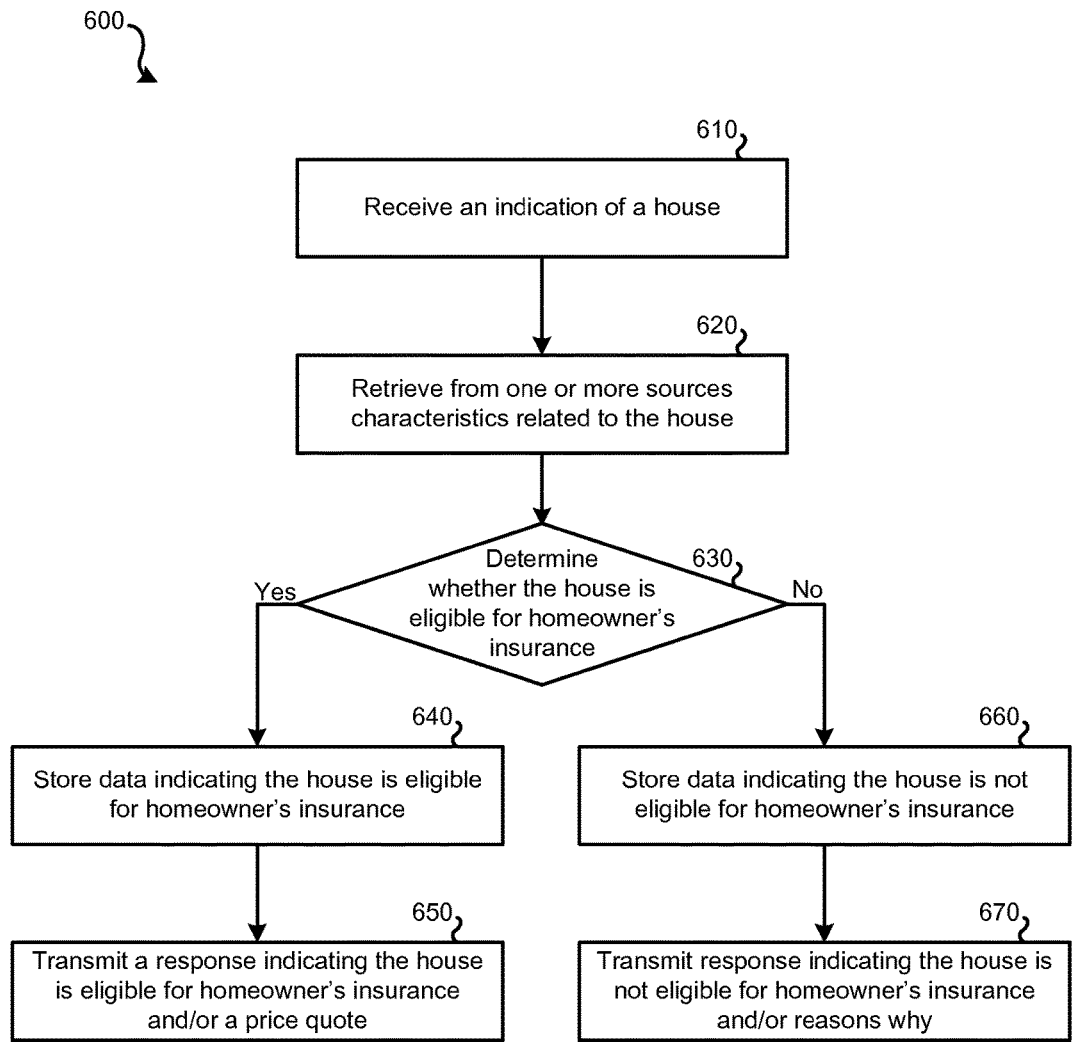
FIG. 6 is a high level flowchart illustrating a method for alerting a prospective homebuyer whether a house is eligible for homeowner's insurance according to an embodiment of the present invention.

FIG. 4 is a high level schematic diagram illustrating a system for determining insurability based on geohazards and other characteristics of a home according to an embodiment of the present invention. The insurability system 400 includes a processor 414 and a memory 416. The description provided in relation to processors and memory in FIG. 6 is also applicable to the processor 414 and memory 416. The processor interacts with the search query input 410 to receive queries from a user and to perform a check insurability function utilizing the geohazard databases 412. The geohazard databases may be proprietary to the insurance company operating the insurability 400, proprietary to a third party provider, publicly available, or combinations thereof. The geohazard databases may be a single database, multiple databases, local, or remote. Results from the check insurability function can be stored in memory 416 for future use in display to the customer using the insurability data output 420 or by other means.

In an embodiment, a user enters an address of interest using the search query input 410 and the system checks the insurability using the geohazard databases 412. Information on the geohazards and other characteristics affecting insurability can be presented to the user using the insurability data output 420. If the property associated with the address is in an area for which the geohazards pose a risk greater than a predetermined risk level, the insurance company may determine that the property is uninsurable and communicate this fact to the user through the insurability data output 420. The process of determining that the property is uninsurable will utilize the insurability engine 432, which has access to the insurance database 436. If the property is insurable, then the insurance engine 430 will use the pricing engine 434 to compute the premium for the property. The premium can include a baseline premium and an additional premium based on the geohazards associated with the address. The insurance database 436 and the geohazard databases 412 can be combined into a single database in some embodiments. One of ordinary skill in the art would recognize many variations, modifications, and alternatives.

Figure 5:
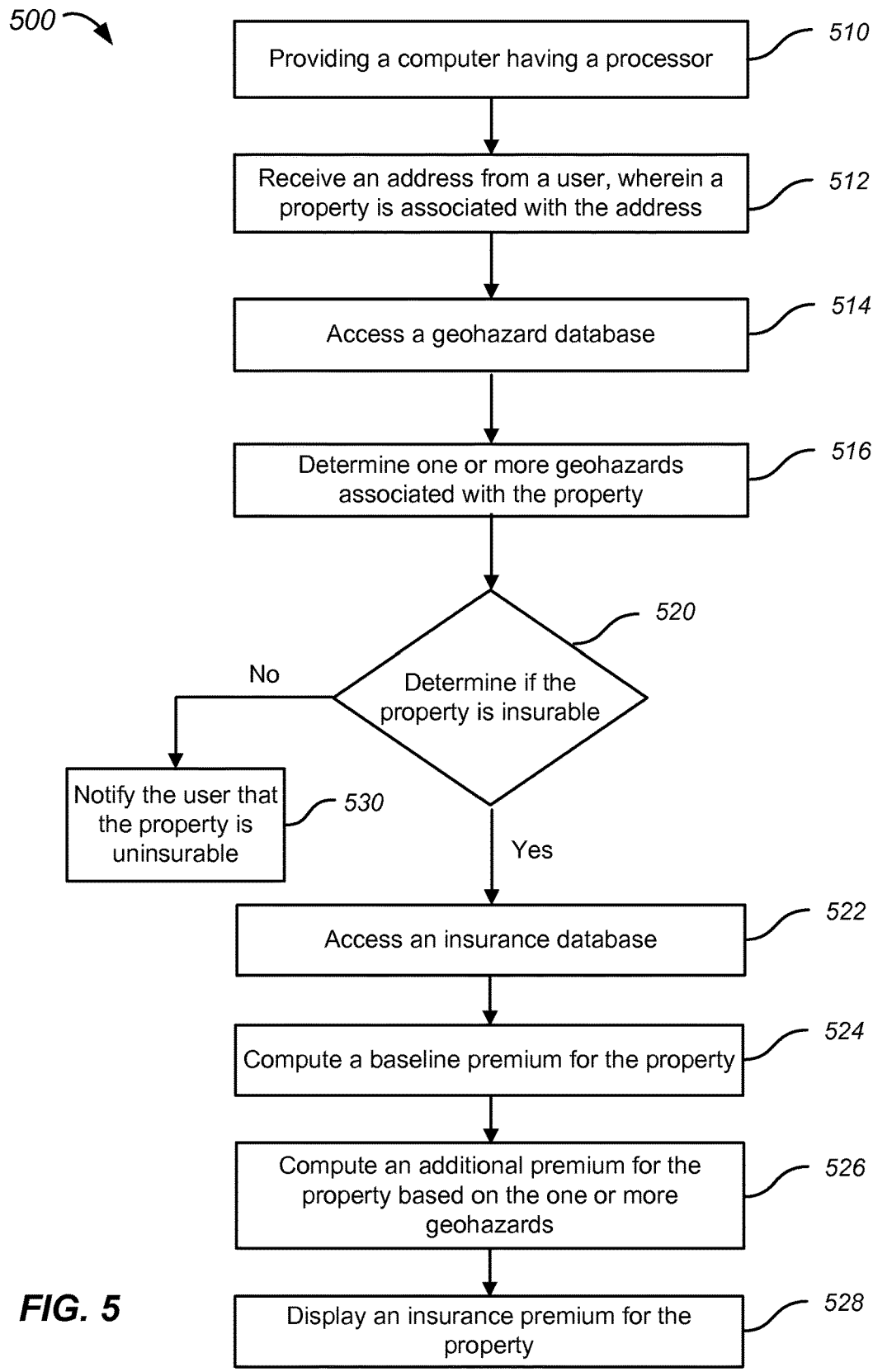
FIG. 5 is a high level flowchart illustrating a method of determining insurability based on geohazards and informing a user of the insurability status according to an embodiment of the present invention.

FIG. 5 is a high level flowchart illustrating a method of determining an insurability status based on geohazards and informing a user of the insurability status according to an embodiment of the present invention. The method 500 includes providing a computer having a processor (510). Typically, the computer is a computer provided and operated by an insurance company and is accessible to the user through the Internet. In another embodiment, the user interacts with an agent of the insurance company, who provides inputs to the computer through an appropriate interface. The method also includes receiving an address from the user (512). A property is associated with the address. As an example, a user may input the address using the search query input 410 illustrated in FIG. 4. The address may be submitted by the user and received by the computer through an Internet web page, for example, an Internet site operated by the insurance company.

The method further includes accessing, using the processor, a geohazard database (514). The geohazard database may be a proprietary geohazard database provided by the insurance company (e.g., the insurance company operating insurability system 400), a proprietary database maintained by a third party provider, a publicly available database, or a database compiling information from both publicly available sources and proprietary sources. One of ordinary skill in the art would recognize many variations, modifications, and alternatives. The method also includes determining, using the processor, one or more geohazards associated with the property (516). The processor 414 illustrated in FIG. 4 may be used to determine the one or more geohazards associated with the property. A determination is made, based on the geohazard data, of whether or not the property is insurable (520). For some properties, the presence of one or more geohazards, such as location in a flood plain, location in a brush fire zone, or any of the other geohazards discussed herein, may present a high enough risk to the insurance company that the company will not insure the given property. If the property is not insurable based on the geohazards, then the user is notified that the property is uninsurable (530). Thus, embodiments of the present invention provide a "Check Insurability" functionality not provided by conventional systems. The user may be notified that the property is uninsurable the Internet web page for example, through an Internet site operated by the insurance company.

If the property is insurable, then the processor is used to access an insurance database (522), such as insurance database 436 illustrated in FIG. 4. Typically, the insurance database is provided by an insurance company, for example, the insurance company operating the insurability system 400. The processor 414 can be utilized to access the insurance database or a processor in the insurability engine 432 can be utilized. It will be evident to one of skill in the art that the various functions performed by the processors described herein can be performed by a single processor, multiple processors, or combinations thereof. In some embodiments, the processing of information in insurance databases and geohazard databases may be carried out using dedicated hardware such as an application specific integrated circuit (ASIC). In yet other embodiments, the processing may be carried out using a combination of software and hardware. As an example, such processors include dedicated circuitry, ASICs, combinatorial logic, other programmable processors, combinations thereof, and the like. Thus, processors as provided herein are defined broadly and include processors adapted to receive and process queries, search databases, determine insurability and pricing of policies, store and output results, perform communications functions, and the other functionality described herein.

A baseline premium is computed for the property (524). The baseline premium, which can be considered as a premium independent of the one or more geohazards, is typically calculated using the pricing engine 434 as illustrated in FIG. 4. Processor 414 can be utilized in pricing the policy at the baseline level or a processor in the pricing engine can be utilized. An additional premium is computed based on the one or more geohazards (526). In some embodiments, the computation of the baseline premium and the additional premium based on the one or more geohazards is combined into a single computation. One of ordinary skill in the art would recognize many variations, modifications, and alternatives. The insurance premium for the property is displayed (528). The insurance premium includes the baseline premium and the additional premium based on the one or more geohazards. Thus, embodiments of the present invention provide a customer with a quote for the insurance premium that is tailored to the particular property of interest, including the geohazards associated with the property. Utilizing embodiments of the present invention, a customer is able to determine if a property is insurable and, if it is insurable, get a quote on the insurance including any additional premiums based on geohazards.

It should be appreciated that the specific steps illustrated in FIG. 5 provide a particular method of determining an insurability status based on geohazards and informing a user of the insurability status according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Although, in the embodiment illustrated in FIG. 5, the address is received from a user, this is not required by the present invention. Referring to FIG. 3, the address could be produced as part of the search results and then used in performing the method described in relation to FIG. 5. Utilizing an address from the search results, the process of checking insurability and quoting an insurance premium for a policy as illustrated in FIG. 5 could be performed. Thus, the steps described in FIGS. 3 and 5 can be combined to not only display geohazard data, but to quote insurance policies in light of any geohazards associated with the property.

FIG. 6 is a high level flowchart illustrating a method 600 for alerting a prospective homebuyer whether a house is eligible for homeowner's insurance. The term "house" is used generally to refer to a piece of property on which homeowner's insurance may be issued, such as a condominium, stand-alone house, townhouse, or the like.

At step 610, an indication of a house is received by a computer system, such as insurability system 110. The indication may be an address of the house. For example, a prospective buyer may desire information regarding whether a house is eligible for homeowner's insurance while attending an open house or driving by a house that has a "for sale" sign on the lawn. As such, the prospective buyer may enter and submit the house's address to the computer system of the financial entity using a mobile device, such as a cellular phone. If the customer's mobile device is GPS enabled, the indication may be GPS coordinates. Rather than an address, the GPS coordinates may be used to identify the closest house. If GPS coordinates are used, the computer system may perform an address lookup, such as by using the GPS coordinates to identify an address. The address may be transmitted back to the mobile device of the prospective buyer. The prospective buyer may be prompted to confirm the address of the house. Rather than a mobile device, the indication may be received from some other electronic device, such as a remote computer system. For example user computer 850 of FIGS. 1 and 8 may be used.

At step 620, based on the address and/or GPS coordinates received as the indication of the house, the computer system operated by the financial entity retrieves characteristics about the house from one or more sources. The computer system may access one or more databases, which may be public or private. The financial entity may maintain one or more private databases that describe various houses, such as real estate database 120 of FIG. 1. Further, external databases such as real estate database 124 of FIG. 1 may be accessed by the computer system to retrieve information about the house. For instance, real estate database 124 may be accessed for information such as: the number of bedrooms, number of bathrooms, square footage, the year the house was built, the exterior of the house (e.g., brick façade, wood, stucco) the square footage of the property, whether a garage (detached or attached) is present, whether a basement is present (if so, whether the basement is finished or unfinished), how many stories the house has, whether storm shutters are installed, the type of roofing, the shape of the roof (e.g., flat, sloped, gable, saltbox, gambrel, mansard), and how the roof is attached to the house frame, etc. Other public or private databases may be accessed to determine if the house is located within a flood plane, near the coast, or is subject to any other geohazard.

In some embodiments, the prospective buyer is prompted to provide information. If information regarding the house is not available in the databases, or no databases exist that contain the requisite information to make the determination as to whether the house is eligible for homeowner's insurance, the prospective homebuyer may be prompted to provide the information. For example, if the prospective homebuyer provided the indication from the prospective homebuyer's mobile device, the prospective homebuyer may be provided with one or more queries on the mobile device, such as: "What year was the house built?" and "Does the house have a detached garage?"

At step 630, the computer system determines whether the house is eligible for homeowner's insurance. Some or all of the characteristics of the house retrieved at step 620 may be used to make the determination as to whether the house is eligible for homeowner's insurance issued by the financial entity. In some embodiments, not enough information may be present to make a determination and the prospective homebuyer may be provided with contact information to discuss with a representative of the financial entity. The determination of step 630 may be based on various rules defined by the financial entity. For example, a rule may be that "no house in Florida built before 1981 is to qualify for homeowner's insurance." As such, based on the build date of the house and its address, a determination can be made using this rule whether a house is eligible for homeowner's insurance. Many of such rules may be present. Rules may define certain geographic areas, certain types of housing construction, and/or other characteristics that when present in a house, individually or in combination, prevent or allow eligibility for homeowner's insurance from the financial entity.

As examples of rules that may be applied, the following rules, individually or in combination, may be used to determine whether a house is eligible for homeowner's insurance. The building codes in effect for the construction of the house may be used. A latitude and longitude of the house may be used. The latitude and longitude may be used in conjunction with a variety of stored data that defines geographical areas that are at risk for hazards, such as high winds, flooding, fires, mold, erosion, hail, tornadoes, hurricanes, burglary, arson, etc. Internal and external databases may be examined to determine the loss history of the house. For example, if a previous claim has been submitted on a house for water damage, coverage for mold may be made unavailable. As another example, if more than a threshold number of claims have been submitted for a house (by the current owner or one or more previous owners), the house may be considered ineligible for homeowner's insurance. (Further, besides using previous losses associated with the house only for determination of whether the house is eligible for homeowner's insurance, a listing of some or all of the claims may be provided to the prospective homebuyer. As an example, if multiple claims have been submitted for house break-ins, the prospective homebuyer may be dissuaded from purchasing the home.)

Characteristics of the prospective homebuyer may also factor into the rules to determine whether the house is eligible for homeowner's insurance. The number, type, and/or value of claims previously submitted by the prospective homebuyer may be considered in determining whether to provide coverage on the home. The prospective homebuyer's behavior may also be considered, for example, whether the prospective homebuyer has had a history of damaging property, or whether the prospective homebuyer is considered likely to mitigate risks on the house (e.g., installing storm shutters, installing a sump pump). Loyalty of the prospective homebuyer may also be considered. A house that may otherwise not be eligible for homeowner's insurance may be considered eligible if the prospective homebuyer has a significantly long, profitable and/or small enough number of claims with the insurance company.

The expected profit margin of the homeowner's insurance policy may also be evaluated. For example, in a region whether the insurance company would otherwise be unlikely to consider a house eligible for homeowner's insurance, if the homeowner's insurance policy is considered likely to be profitable over a threshold amount, the house may be eligible for a homeowner's insurance policy to be issued to the prospective homebuyer. In some embodiments, for each evaluated house, the estimated profitability may be used to determine whether a homeowner's policy is available to the prospective homebuyer. As an example of profitability being used in conjunction with loyalty to determine whether a house is eligible for homeowner's insurance, a homeowner's insurance policy that is expected to be profitable by at least 25% may be issued to prospective homebuyer. If the prospective homebuyer has been a customer of the insurance company for a significant period of years, the homeowner's insurance policy may only need to be profitable by a smaller percentage, such as 20%, for the insurance company to consider the home eligible for the homeowner's insurance policy for the prospective homebuyer.

At step 630, in addition to using characteristics of the house to determine whether the house is eligible for homeowner's insurance issued by the financial entity, characteristics of the prospective homebuyer may be used. For example, the computer system may factor in whether the prospective homebuyer is an active duty member of the military. The financial entity, such as the present assignee, may be more likely to issue homeowner's insurance to an active duty member of the military than other persons. Preferences of the prospective homebuyer may be considered at step 630. If the prospective homebuyer has specified specific provisions that the prospective homebuyer desires in a homeowner's insurance policy, these provisions may be analyzed for availability on the house. For example, if the prospective homebuyer specified that flood insurance is desired as part of the homeowner's insurance policy, at step 630 it may be determined whether the house qualifies for flood insurance to be issued by the financial entity.

In addition to determining whether a house is eligible for homeowner's insurance, a cost of homeowner's insurance may be determined by the computer system of the financial entity. This may involve providing a price quote or a range of prices in which the cost of homeowner's insurance is expected to be. The quote may include a yearly premium cost and/or the deductible cost. For example, in regions having a high likelihood of a geohazard (e.g., a geographic region susceptible to hurricanes) a higher deductible may be made mandatory by the financial entity issuing the homeowner's insurance, such as 2% of the dwelling's total insured value.

If homeowner's insurance is eligible to be issued by the financial entity, method 600 proceeds to step 640. At step 640, data that indicates that the house is insurable is stored by the computer system. As such, the data may be retrieved at a later time. If a price quote was generated at step 630, information related to the price quote may be stored by the computer system.

At step 650, a response indicating that the house qualifies for homeowner's insurance and/or a price quote for the homeowner's insurance is transmitted to the prospective homebuyer. If the indication was received at step 610 from a mobile device, the response of step 650 may be transmitted to the mobile device. The response may be received by the prospective homebuyer substantially in real time (e.g., within a few minutes). For example, following the indication being sent at step 610, within a few minutes the prospective homebuyer may receive a response at either step 650 or 670.

Returning to step 630, if the house is not eligible for homeowner's insurance, method 600 may proceed to step 660. At step 660, data that indicates that the house is not insurable is stored by the computer system. As such, the data may be retrieved at a later time. At step 670, a response indicating that the house is not insurable is transmitted to the prospective homebuyer. The response may indicate one or more reasons as to why the house does not qualify for homeowner's insurance. If the indication was received at step 610 from a mobile device, the response of step 670 may be transmitted to the mobile device.

In the illustrated embodiment of method 600, a prospective homebuyer is provided with information regarding the availability and/or a homeowner's insurance quote for one house. However, in some embodiments, the homebuyer may be provided with qualification information and/or quotes for homeowner's insurance for multiple houses at once. For example, a prospective homebuyer may be able to select a region on a map of houses. Eligibility and/or homeowner's insurance price quotes may be provide for some or all of the houses within this region. Such a map may be useful for a prospective homebuyer to determine if only a particular house is not eligible for homeowner's insurance or a large number of the houses in a geographic region are not eligible.

It should be appreciated that the specific steps illustrated in FIG. 6 provide a particular method for alerting a prospective homebuyer whether a house is eligible for homeowner's insurance according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step.

If the prospective homebuyer decides not to purchase the house (whether due to the availability and/or price of homeowner's insurance or for one or more other reasons) the data stored at step 640 may not be used in the future. However, if the prospective homebuyer decides to purchase the house and enters a contract to purchase the house, the data stored at step 640 or step 660 may be used when the homebuyer attempts to purchase homeowner's insurance from the financial entity on whose behalf the computer system of method 600 is operated, such as in method 700.

Figure 7:
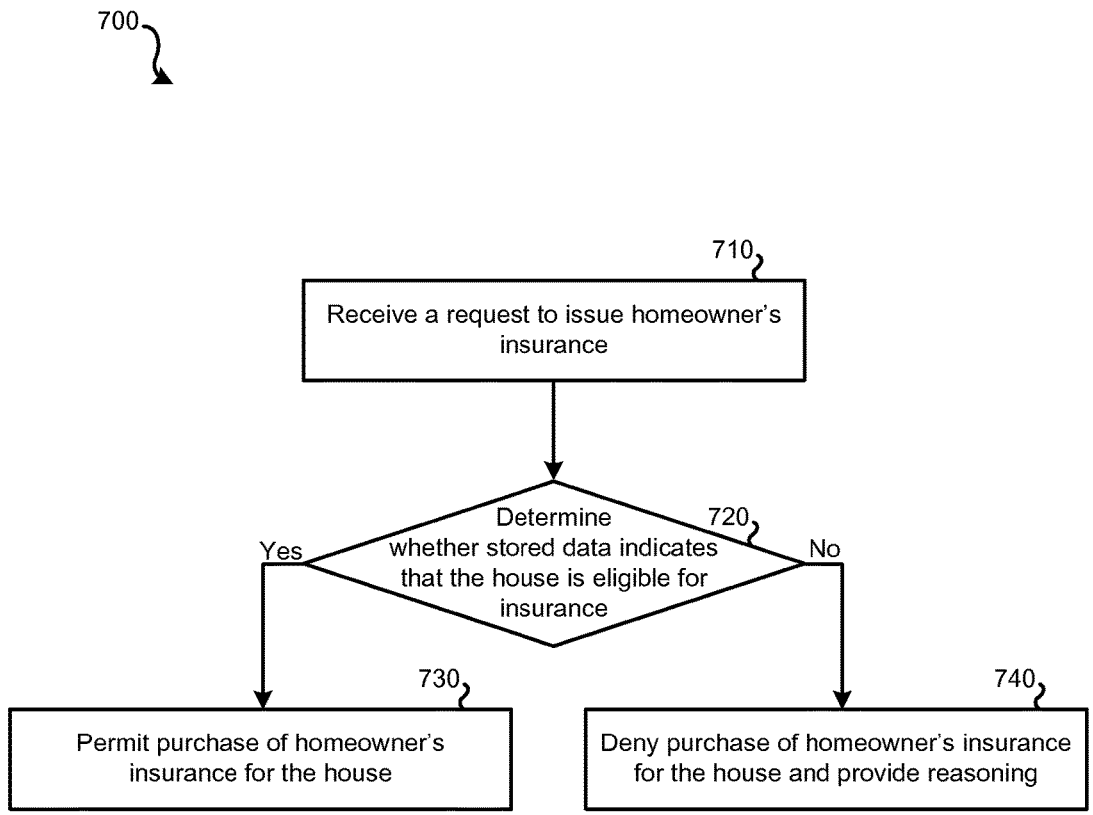
FIG. 7 is a high level flowchart illustrating a method for issuing homeowner's insurance based on a previous indication of whether the house is eligible for homeowner's insurance according to an embodiment of the present invention.

FIG. 7 is a high level flowchart illustrating an embodiment of a method 700 for issuing homeowner's insurance based on a previous indication of whether the house is eligible for homeowner's insurance. At step 710, a request may be received by a computer system, such as the computer system of method 600 for homeowner's insurance to be issued for the house for which method 600 was performed. The request may be received from the homebuyer (who, since the prospective homebuyer has now likely entered contract on the house, is now referred to as the homebuyer). The request may be received from a computer system operated by the homebuyer, such as user computer 850 of FIGS. 1 and 8 or a mobile device operated by the homebuyer.

At step 720, it is determined whether the stored data related to the house indicates that the house qualifies for homeowner's insurance. It may also be determined whether a price quote for homeowner's insurance premiums and/or a deductible has been provided to the homebuyer by using information stored at step 640 or step 660. If, at step 640 of method 600, information was stored by the computer system indicating that the house is eligible for homeowner's insurance, and at step 650 of method 600, a response indicating that the house is eligible for homeowner's insurance was transmitted to the prospective homebuyer, the homebuyer may be permitted to purchase homeowner's insurance from the financial entity at step 730. If a price quote for homeowner's insurance premiums and/or a deductible was quoted to the prospective homebuyer at step 650, the financial entity that is to issue the homeowner's insurance to the homebuyer may match the price quote previously provided. In some embodiments, the financial entity may guarantee that the price of homeowner's insurance premiums and/or deductibles will not vary more than a certain percentage or fixed amount from the previous provided quote.

If, at step 660 of method 600, information was stored by the computer system indicating that the house is not insurable and a response indicating that the house is not insurable was transmitted to the prospective homebuyer at step 670, the homebuyer may be denied purchasing homeowner's insurance at step 740. Reasoning may be provided to the homebuyer. For example, the reasoning may state: "You were previously informed that this house does not qualify for homeowner's insurance issued by this financial entity for the house specified. This financial entity does not provide homeowner's insurance for houses located along Florida's coast."

It should be appreciated that the specific steps illustrated in FIG. 7 provide a particular method of issuing homeowner's insurance based on a previous indication of whether the house is eligible for homeowner's insurance according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step.

FIG. 8 illustrates a high level schematic diagram of a computer system including instructions to perform any one or more of the methodologies described herein. Such a computer system may be operated on behalf of an insurance entity, such as the insurance entity that insurability system 110 is operated on behalf of. A system 800 includes a computer 810 connected to a communication network 110-2 (referred to as network 110-2 for simplicity), which may represent the same or a different network(s) from network 110-1 of FIG. 1. Computer 810 may represent a component of insurability system 110 of FIG. 1. The computer 810 includes a processor 820 (also referred to as a data processor), a storage device 822, an output device 824, an input device 826, and a network interface device 828, all connected via a bus 830. The processor 820 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 820 executes instructions and includes that portion of the computer 810 that controls the operation of the entire computer. Although not depicted in FIG. 8, the processor 820 typically includes a control unit that organizes data and program storage in memory and transfers data and other information between the various parts of the computer 810. The processor 820 receives input data from the input device 826 and network 110-2, reads and stores code and data in the storage device 822, and presents data to the output device 824.

Although the computer 810 is shown to contain only a single processor 820 and a single bus 830, the disclosed embodiment applies equally to computers that may have multiple processors and to computers that may have multiple busses with some or all performing different functions in different ways.

The storage device 822 represents one or more mechanisms for storing data. For example, the storage device 822 may include read-only memory (ROM), random access memory (RAM), magnetic disk storage media, optical storage media, flash memory devices, and/or other machine-readable media. In other embodiments, any appropriate type of storage device may be used. Although only one storage device 822 is shown, multiple storage devices and multiple types of storage devices may be present. Further, although the computer 810 is drawn to contain the storage device 822, it may be distributed across other computers, for example on a server.

The storage device 822 includes a controller (not shown in FIG. 8) and data items 834. The controller includes instructions capable of being executed on the processor 820 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 822 may also contain additional software and data (not shown), which is not necessary to understand the invention.

Although the controller and the data items 834 are shown to be within the storage device 822 in the computer 810, some or all of them may be distributed across other systems, for example on a server and accessed via the network 110-2.

The output device 824 is that part of the computer 810 that displays output to the user. The output device 824 may be a liquid crystal display (LCD) well known in the art of computer hardware. But, in other embodiments the output device 824 may be replaced with a gas or plasma-based flat-panel display or a traditional cathode-ray tube (CRT) display. In still other embodiments, any appropriate display device may be used. Although only one output device 824 is shown, in other embodiments any number of output devices of different types, or of the same type, may be present. In an embodiment, the output device 824 displays a user interface.

The input device 826 may be a keyboard, mouse or other pointing device, trackball, touchpad, touch screen, keypad, microphone, voice recognition device, or any other appropriate mechanism for the user to input data to the computer 810 and manipulate the user interface previously discussed. Although only one input device 826 is shown, in another embodiment any number and type of input devices may be present.

The network interface device 828 provides connectivity from the computer 810 to the network 110-2 through any suitable communications protocol. The network interface device 828 sends and receives data items from the network 110-2.

The bus 830 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 810 may be implemented using any suitable hardware and/or software, such as a personal computer or other electronic computing device. Portable computers, laptop or notebook computers, PDAs (Personal Digital Assistants), mobile phones, pocket computers, tablets, appliances, telephones, and mainframe computers are examples of other possible configurations of the computer 810. For example, other peripheral devices such as audio adapters or chip programming devices, such as EPROM (Erasable Programmable Read-Only Memory) programming devices may be used in addition to, or in place of, the hardware already depicted.

The network 110-2 may be any suitable network and may support any appropriate protocol suitable for communication to the computer 810. In an embodiment, the network 110-2 may support wireless communications. In another embodiment, the network 110-2 may support hard-wired communications, such as a telephone line or cable. In another embodiment, the network 110-2 may support the Ethernet IEEE (Institute of Electrical and Electronics Engineers) 802.3x specification. In another embodiment, the network 110-2 may be the Internet and may support IP (Internet Protocol). In another embodiment, the network 110-2 may be a local area network (LAN) or a wide area network (WAN). In another embodiment, the network 110-2 may be a hotspot service provider network. In another embodiment, the network 110-2 may be an intranet. In another embodiment, the network 110-2 may be a GPRS (General Packet Radio Service) network. In another embodiment, the network 110-2 may be any appropriate cellular data network or cell-based radio network technology. In another embodiment, the network 110-2 may be an IEEE 802.11 wireless network. In still another embodiment, the network 110-2 may be any suitable network or combination of networks. Although one network 110-2 is shown, in other embodiments any number of networks (of the same or different types) may be present.

A user computer 850 can interact with computer 810 through network 110-2. User computer 850 may represent device 108 and/or device 130 of FIG. 1. The user computer 850 includes a processor 852, a storage device 854, and an input/output device 856. The description related to processor 820 and storage device 822 is applicable to processor 852 and storage device 854. As an example, the user computer 850 can be a personal computer, laptop computer, or the like, operated by a member of a membership organization (e.g., the present assignee). Using the user computer 850, the member can then interact with computer 810 operated by the present assignee through network 110-2 in order to access the present assignee's web pages or the like.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is also understood that the examples and embodiments described herein are for illustrative purposes only and that various modifications or changes in light thereof will be suggested to persons skilled in the art and are to be included within the spirit and purview of this application and scope of the appended claims.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Further, the preceding description details modifying an umbrella travel insurance policy. It should be understood that similar systems and methods may be used to provide other forms of modified insurance policies, such as homeowner's insurance, automotive insurance, renter's insurance, valuable personal property insurance, fire insurance, flood insurance, etc.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method comprising:
   receiving, from a location sensor in a user device associated with a prospective home buyer, a device location, wherein the location sensor includes a global positioning system (GPS);
   receiving real estate search criteria from the user device associated with the prospective home buyer by a computer system associated with an entity that issues homeowner's insurance;
   determining, by the computer system and using a real estate database, at least one house that matches the real estate search criteria based at least in part on the device location;
   retrieving, by the computer system, from a proprietary geohazard database, geohazard characteristics that are linked with each of the at least one house;
   analyzing, in substantially real-time, the geohazard characteristics;
   determining that the at least one house qualifies for homeowner's insurance based on analysis of the geohazard characteristics;
   determining an insurance cost based on the analysis the geohazard characteristics;
   transmitting, by the computer system to the user device in substantially real-time, an indication that the at least one house qualifies for homeowner's insurance and the insurance cost;
   retrieving, by the computer system, from a third database, prospective purchaser characteristics related to a prospective purchaser;
   determining, by the computer system, using characteristics comprising the geohazard characteristics and non-geohazard characteristics related to the at least one house and the prospective purchaser characteristics, total cost of ownership information comprising estimated utility costs, estimated property taxes, and estimated mortgage expenses;
   transmitting, by the computer system, to the user device, the total cost of ownership information for the at least one house; and
   causing to be displayed, on a user interface of the user device, real estate search results including a listing associated with the at least one house, wherein the listing comprises a first indicator that the respective house qualifies for homeowner's insurance and an additional indicator of the respective insurance cost wherein the respective insurance cost includes a detail display, and wherein the detail display includes a baseline premium independent of the geohazard characteristics, a geohazard premium based on the geohazard characteristics, and the total cost of ownership information.

2. The method of claim 1 wherein the prospective purchaser has entered a contract to purchase a selected house of the at least one house, the method further comprising:
  receiving, by the computer system, a request to issue homeowner's insurance covering the selected house the request submitted by the prospective purchaser; and
  permitting the prospective purchaser to purchase homeowner's insurance from the entity that issues homeowner's insurance.

3. The method of claim 1, further comprising determining that the prospective purchaser is an active duty member of a military based on the prospective purchaser characteristics, wherein determining whether each house of a plurality of houses including the at least one house qualifies for homeowner's insurance by the entity that issues homeowner's insurance is at least partially based on the prospective purchaser being the active duty member of the military.

4. A non-transitory computer-readable storage medium comprising computer-readable instructions that causes a processor executing the computer-readable instructions to effectuate operations comprising:
  providing a proprietary geohazard database, the proprietary geohazard database including geohazard information aggregated from at least one internal source and at least one external source;
  receiving real estate search criteria from a user device associated with a prospective home buyer by a computer system comprising the processor, the computer system associated with an entity that issues homeowner's insurance, wherein the real estate search criteria is based on a location of the user device determined at least in part by a global positioning system (GPS) in the user device;
  determining a plurality of houses that match the real estate search criteria using a real estate database;
  retrieving, from the proprietary geohazard database, geohazard characteristics that are linked with each of the plurality of houses;
  analyzing, in substantially real-time, the geohazard characteristics;
  identifying at least one house of the plurality of houses that qualifies for homeowner's insurance based on analysis of the geohazard characteristics;
  for the at least one house, determining an insurance cost based on the analysis of the geohazard characteristics;
  transmitting to the user device in substantially real-time an indication of whether each of the plurality of houses qualifies for homeowner's insurance and, for the at least one house, the insurance cost;
  retrieving prospective purchaser characteristics related to a prospective purchaser;
  determining, using characteristics comprising the geohazard characteristics and non-geohazard characteristics related to the at least one house and the prospective purchaser characteristics, total cost of ownership information comprising estimated utility costs, estimated property taxes, and estimated mortgage expenses;
  transmitting, by the computer system, to the user device, the total cost of ownership information for the at least one house; and
  causing to be displayed, on an interface of the user device, real estate search results comprising a plurality of listings, wherein each listing is associated with one of the plurality of houses and each listing comprises an indicator of whether the respective house qualifies for homeowner's insurance and wherein each listing associated with the at least one house includes an additional indicator of the respective insurance cost, wherein the respective insurance cost includes a detail display, and wherein the detail display includes a baseline premium independent of the geohazard characteristics, a geohazard premium based on the geohazard characteristics, and the total cost of ownership information.

5. The non-transitory computer-readable storage medium of claim 4 wherein the user device is a mobile user device.

6. The non-transitory computer-readable storage medium of claim 4, the operations further comprising:
  determining whether each house of the plurality of houses qualifies for homeowner's insurance by the entity that issues homeowner's insurance is at least partially based on a prospective purchaser being an active duty member of the military.

7. A system for managing communications relating to real estate, the system comprising:
  a processor;
  memory coupled to the processor, the memory storing instructions that cause the processor to effectuate operations comprising:
  receiving real estate search criteria from a user device associated with a prospective home buyer by a computer system comprising the processor, the computer system associated with an entity that issues homeowner's insurance, wherein the real estate search criteria is based on a location of the user device determined at least in part by a global positioning system (GPS) in the user device;
  determining a plurality of houses that match the real estate search criteria using a real estate database;
  retrieving, from a proprietary geohazard database, geohazard characteristics that are linked with each of the plurality of houses;
  analyzing, in substantially real-time, the geohazard characteristics;
  determining whether any of the plurality of houses were previously identified as uninsurable based on analysis of the geohazard characteristics, wherein any house identified is removed from a remaining plurality of houses;
  identifying at least one house of the remaining plurality of houses that qualifies for homeowner's insurance based on the analysis of the geohazard characteristics;
  for the at least one house, determining an insurance cost based on the analysis of the geohazard characteristics;
  transmitting, to the user device in substantially real-time, an indication of any of the plurality of houses which were previously identified as uninsurable based on the geohazard characteristics;
  retrieving prospective purchaser characteristics related to a prospective purchaser;
  determining, using characteristics comprising the geohazard characteristics and non-geohazard characteristics related to the at least one house and the prospective purchaser characteristics, total cost of ownership information comprising estimated utility costs, estimated property taxes, and estimated mortgage expenses;
  transmitting to the user device the total cost of ownership information for the at least one house;
  transmitting, to the user device, an indication of whether each of the remaining plurality of houses qualifies for homeowner's insurance and, for the at least one house, the insurance cost; and causing to be displayed, on an interface of the user device, real estate search results comprising a plurality of listings, wherein each listing is associated with one of the plurality of houses and each listing comprises an indicator of whether the respective house qualifies for homeowner's insurance and wherein each listing associated with the at least one house includes an additional indicator of the respective insurance cost associated with each insurable house, wherein the respective insurance cost includes a detail display, and wherein the detail display includes a baseline premium independent of the geohazard characteristics, a geohazard premium based on the geohazard characteristics, and the total cost of ownership information.

8. The system of claim 7, wherein identifying at least one house of the remaining plurality of houses that qualifies for homeowner's insurance is further based on the prospective purchaser characteristics.

9. The system of claim 7, the operations further comprising:
   determining that a prospective purchaser is an active duty member of a military, wherein determining whether each house of the plurality of houses qualifies for homeowner's insurance by the entity that issues homeowner's insurance is at least partially based on whether the prospective purchaser is the active duty member of the military.

10. The system of claim 8, wherein the prospective purchaser characteristics include a projected profit margin of a related insurance policy.

11. The system of claim 8, wherein the prospective purchaser characteristics include a length of time the prospective purchaser has been a member of an organization.

12. The system of claim 8, wherein the prospective purchaser characteristics include an insurance claim history of the prospective purchaser.

13. The system of claim 7, wherein the additional indicator for each listing includes a cost differential of the respective insurance cost based on the geohazard characteristics.

14. The system of claim 7, wherein one of the indicator or the additional indicator includes a risk index number based on the geohazard characteristics.

15. The system of claim 7, wherein the geohazard characteristics include information regarding building codes associated with at different dates.

\* \* \* \* \*